United States Patent [19]

Fessett

[11] Patent Number: 5,090,640
[45] Date of Patent: Feb. 25, 1992

[54] AIRCRAFT DOOR OPERATING MECHANISM

[75] Inventor: Donald J. Fessett, Chino Hills, Calif.

[73] Assignee: Lucas Western, Inc., Brea, Calif.

[21] Appl. No.: 505,303

[22] Filed: Apr. 5, 1990

[51] Int. Cl.⁵ .................. B64D 25/14; B64D 47/00
[52] U.S. Cl. .................. 244/129.5; 49/379; 292/48; 292/201
[58] Field of Search .................. 244/129.4, 129.5, 905; 292/48, 45, 201; 185/9, 10; 49/379; 16/85

[56] References Cited

U.S. PATENT DOCUMENTS

| | | | |
|---|---|---|---|
| 538,900 | 5/1895 | Dunn | 49/379 |
| 944,494 | 12/1909 | Noel | 49/379 |
| 1,258,234 | 3/1918 | McKee | 292/48 |
| 1,314,950 | 9/1919 | Desmond | 49/379 |
| 1,818,698 | 8/1931 | Dicke et al. | 185/9 |
| 2,175,534 | 10/1939 | Loftin et al. | 16/85 |
| 4,047,441 | 9/1977 | Kellogg | 185/9 |

FOREIGN PATENT DOCUMENTS

482149 8/1953 Italy .................. 292/201

Primary Examiner—Galen Barefoot
Attorney, Agent, or Firm—Pretty Schroeder Brueggemann & Clark

[57] ABSTRACT

A stored energy system for opening aircraft doors, especially useful in connection with emergency slide compartment doors. The system includes a mechanical energy door opening mechanism and a mechanical energy door latch mechanism leaving a latch actuator. Both the latch actuator and the door opening mechanism each have resident stored mechanical energy means wound by rotating an input shaft. Discharge of the energy is prevented by restraining a reverse rotation of the input device, thus enabling the mechanical energy means to be wound in only one direction. When the aircraft door is to be opened, the latch actuator delatches the door and subsequently the door opening mechanism employs a pivotably mounted arm to open the door.

27 Claims, 3 Drawing Sheets fig.1.

AIRCRAFT DOOR OPERATING MECHANISM

BACKGROUND OF THE INVENTION

This invention relates generally to opening mechanisms for aircraft doors and, more particularly, to stored-energy mechanisms that can be actuated in emergencies to rapidly open aircraft doors for exposing emergency equipment, such as a door slide.

The need to open aircraft doors in emergencies frequently arises when electrical power is unavailable. Currently, such doors typically are opened in emergencies using mechanisms that are chemically based, such as pyrotechnics. However, these chemically-based mechanisms generally are inefficient, inelegant and extremely costly. In addition, it is impractical to test these mechanisms periodically after installation aboard an aircraft. These mechanisms also occasionally misfire while the plane is airborne, thereby triggering the early activation of important aircraft safety mechanisms.

There is thus a need for a non-pyrotechnic aircraft door opening mechanism that is less costly to operate, is inherently more reliable, and is operable independently of the aircraft's electrical power system. The present invention satisfies this need.

SUMMARY OF THE INVENTION

The present invention is embodied in an improved aircraft door opening mechanism that is operable to open an aircraft emergency device door during an emergency without the need for electrical power and without the need for pyrotechnics. The door is mounted on an aircraft frame such that, when it is in a closed position, it covers an opening in the frame and, when it is in an open position, it exposes the opening. The door opening mechanism includes door latching means that is movable between a latched position, in which it retains the door in its closed position, and an unlatched position, in which the door can be moved toward its open position. Door opening means also are included for moving the door from its closed position toward its open position when the door latching means is in its unlatched position. In accordance with the invention, the mechanism further includes a first resident means for storing mechanical energy, e.g. a clock spring or equivalent spring, which is selectively actuatable to cause the door latching mean to move to its unlatched position, and a second resident means for storing mechanical energy, e.g., a spiral torsion spring, which is selectively actuatable to cause the door opening means to move the door from its closed position toward its open position. Because the energy required to operate the door opening means is stored in a mechanical form, the mechanism can be operated without the need for electrical power and without the need for dangerous pyrotechnics. The mechanism, thereby, is highly reliable and low in cost, and its reliability can be readily confirmed by periodic non-destructive testing.

More particularly, the door latching means includes a support fixed relative to either the aircraft frame or the aircraft door and a door latch positioned to engage the other of the aircraft frame or the aircraft door. A clock spring is operatively connected between the support and the door latch and is adapted to urge the latch to move out of engagement with the door. In addition, restraint means are included for restraining movement of the door latch under the urging of the spring, but being selectively movable to an unlocked position in which the door latch may be moved under the urging of the spring. In a more-detailed feature of the invention, the door latching means further includes a shaft connected between the spring and the support, the shaft being rotatable about its axis so as to wind the spring and thereby store mechanical energy. One-way releasable locking means restrains the release of the spring's stored mechanical energy, until selective actuation.

The door opening means can include an arm that is pivotally mounted on a support fixed relative to the aircraft frame. A spiral torsion spring, or equivalent spring, is connected between the support and the arm so as to urge the arm into engagement with the door and thereby open the door. Restraint means are included for restraining the arm against such movement, until selectively actuated. Rotatable input means connected between the spiral torsion spring and the support is rotatable about an axis so as to torsionally wind the spring and thereby store mechanical energy. The spiral torsion spring can advantageously be torsionally wound about the same axis as the arm's pivot axis.

While the preferred embodiment utilizes both a clock spring and a spiral torsion spring for the unlatching of the aircraft door and the opening of the aircraft door, it is understood that many alternative types of springs will also serve to achieve the desired effect of replacing pyrotechnic devices previously used.

Other features and advantages of the present invention should become apparent from the following description of the preferred embodiment, taken in conjunction with the accompanying drawings, which illustrate, by way of example, the principles of the invention.

BRIEF DESCRIPTION OF THE DRAWINGS

FIG. 2 is an enlarged view of the latch actuator as viewed in FIG. 1a.

DESCRIPTION OF THE PREFERRED EMBODIMENT

Figure 1:
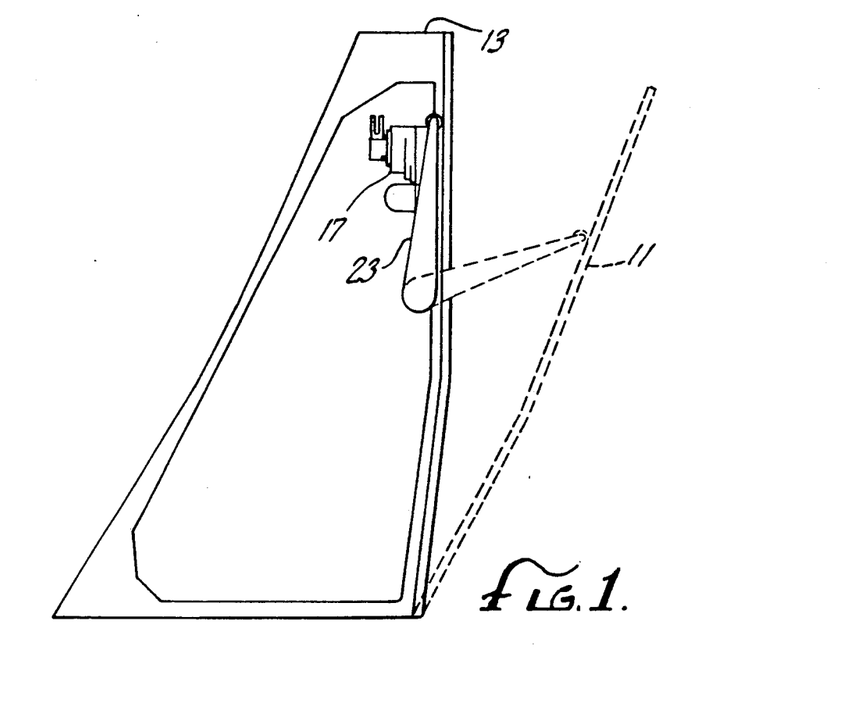
FIG. 1 is a cross-sectional view of an aircraft frame having an external door with a door latch actuator and a door opening mechanism embodying the present invention.
Figure 1A:
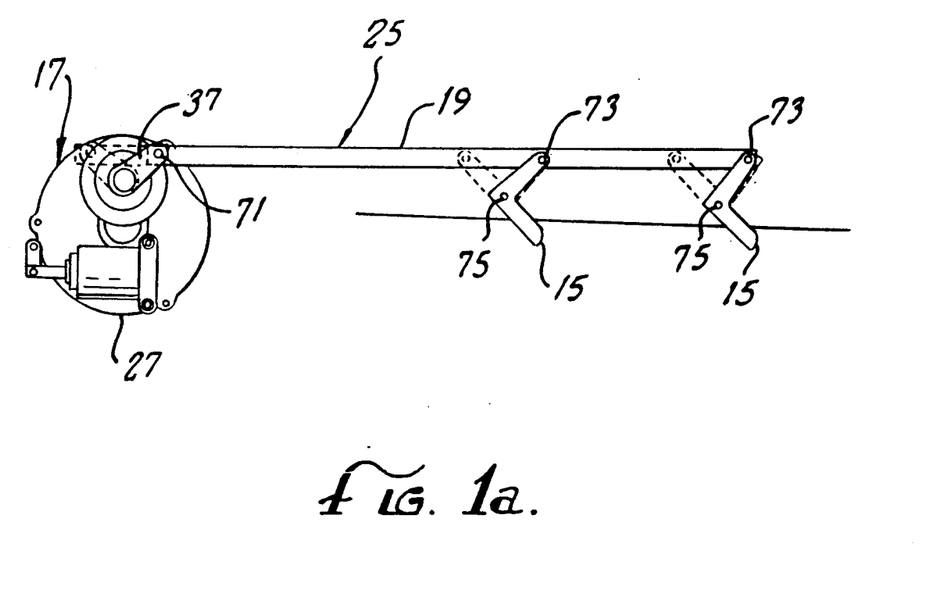
FIG. 1a is a rear elevational view of a latch mechanism included in the door operating mechanism, as viewed from the left side of FIG. 1, i.e., from the inside of the aircraft, including a set of latches and a door latch actuator.

With reference now to the drawings, and particularly to FIGS. 1 and 1a, there is shown a mechanism for unlatching and opening an external door 11 pivotally secured to an aircraft frame 13. The door is shown in FIG. 1 by solid lines in its closed position and by phantom lines in its open position. A set of releasable latches 15 (FIG. 1a) initially retains the door in its closed position. When the door is to be opened, for example to facilitate an emergency exit from the aircraft, the latches are released by a latch actuator 17 that is connected to the latches by a connecting rod 19. Immediately after this release, a door opening mechanism 21 urges an arm 23 to pivot outwardly into engagement with the door, to pivot the door toward its open position.

Figure 2:
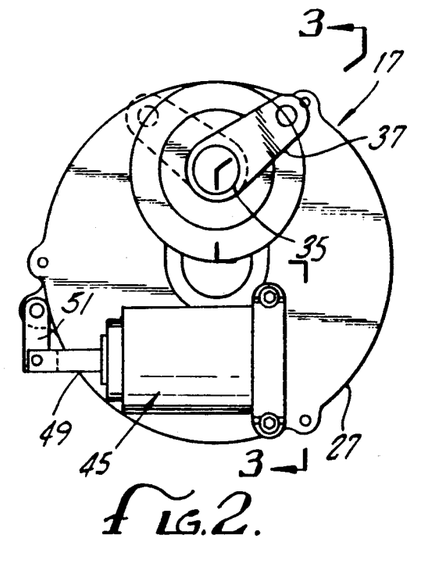
Figure 3:
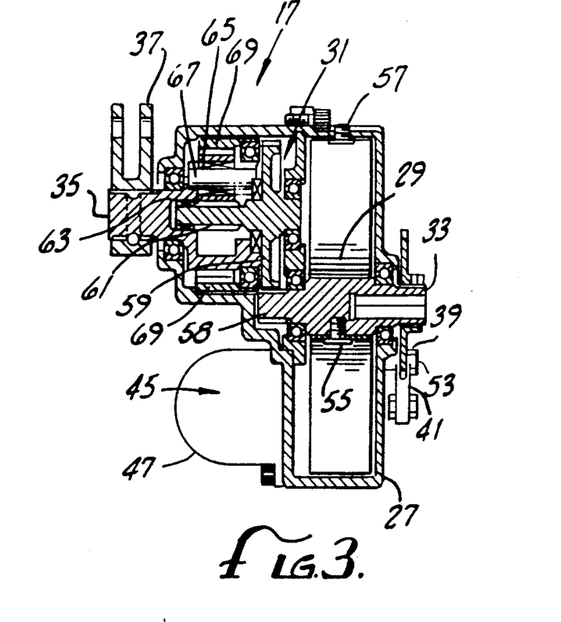
FIG. 3 is a cross-sectional view of the latch actuator, taken in the direction of arrows 3—3 in FIG. 2.
Figure 4:
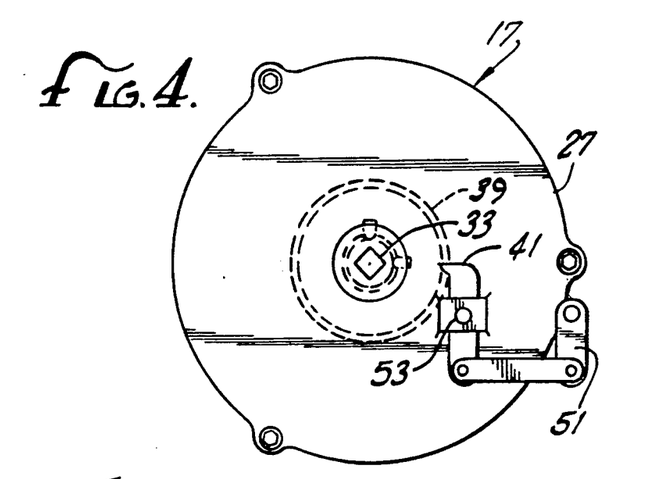
FIG. 4 is a front elevational view of the latch actuator, as viewed from the right side of FIG. 1.

With reference now to FIGS. 2–4, the door latch mechanism 25 will be described in greater detail. As previously mentioned, the actuator releases the set latches 15 via the intermediate connecting rod 19. The actuator includes a generally cylindrical housing 27, which carries a clock spring 29 that stores sufficient mechanical energy to release the latches when actuated. The spring is connected to the rod via a gear reduction assembly 31, with an input shaft 33 connected between the spring and the gear reduction assembly and an output shaft 35 connected between the gear reduction assembly and the rod. The gear reduction assembly reduces the rotational motion of the spring as it is being released and, in so doing, substantially increases the force it provides to the rod. A U-shaped crank 37 converts the small but forceful rotation of the output shaft into substantially longitudinal motion of the rod, to release the latches.

The clock spring 29 in the form of a spiral steel band is tightened within the housing 27 by rotation of an input shaft 33 which is configured to receive a standard mechanical tool. Rigidly affixed to this input shaft, on the exterior of the housing, is a ratchet gear 39, that is engaged by a pawl 41 that normally permits the input shaft 33 to rotate in only one direction, i.e., the direction that tightens the spring. This pawl also functions as a release mechanism that may be controlled either manually or by a solenoid 45. As shown in FIGS. 2 and 3, the solenoid includes a generally half-cylindrical housing 47 bolted to the back side of the actuator housing 27 and a plunger 49 connected to the pawl by a linkage assembly 51. The pawl is pivoted secured to the front side of the actuator housing at a pivot point 53. When the solenoid is actuated, the plunger pulls on the linkage assembly, to pivot the pawl out of engagement with the ratchet gear, thus enabling free rotation of the input shaft.

With specific reference to FIG. 3, the clock spring 29 is connected at one of its ends by a bolt 55 to the input shaft 33 and at the other of its ends by a bolt 57 to the actuator housing 27. The input shaft's interior end 58 is geared so as to couple with the gear reduction assembly 31. As the input shaft rotates, it meshes with the reduction gear wheel 59 effectively reducing the rotational velocity as seen at the reduction gear shaft mesh 61 by a factor n1. Thrust and journal bearings interact between the reduction gear wheel and spider 63. A planetary gear 65 is rotatably borne by a journal bearing on a shaft member 67 of the spider 63 and meshes with both the reduction gear wheel shaft 61 and a ring gear 69 that is fixed to the housing. As the planetary gear is of greater diameter than the reduction gear, a second gear reduction of a factor n2 is effected, causing rotation of the spider at a decreased rotational velocity and at a corresponding increased force. The spider has an output shaft 35 which protrudes from the exterior of the housing. The U-shaped crank 37 is rigidly attached by appropriate means to an end to the output shaft, such that rotation of the output shaft causes the arcuate movement of the U-shaped crank. The intermediate connecting rod 19 is pivotally connected at one end to the interior of the fork by a bolt 71. Intermittently, along its length, the rod is likewise pivotally connected by bolts 73 to the latches, which are pivotally mounted to the aircraft frame by bolts 75. It will thus be observed that rotation of the output shaft causes the latch assembly to function in the manner of a bell crank.

After the clock spring 29 has been wound by forwardly rotating the input shaft 33, it is restrained from release by the pawl 41 and ratchet gear 39. Upon receipt of a control signal, the solenoid 45 pulls the plunger 49 inwardly to withdraw the pawl from the ratchet gear, enabling reverse rotation of the input shaft. This reverse rotation is transmitted via the reduction gear assembly 31 to the crank 37, with rotational velocity reduced by a factor $n1 \times n2$, but a force increased by the same factor. With reference again to FIG. 1a, the arcuate movement of the crank pulls the connecting rod 19 roughly axially, to pivot the set of latches 15 out of their position retaining the door 11 in its closed position. The crank and latches are depicted in their closed positions, retaining the door, via solid lines, and in their open positions, not retaining the door, via dotted lines.

After the actuation of the latch actuator 17 as described above, the door opening mechanism 21 is actuated. With reference again to FIG. 1, the pivot arm 23 and door 11 are shown via solid lines in their closed positions and via dotted lines in their open positions. The pivot arm has at its free end a roller 77 for rolling contact with the door as the arm pivots outwardly.

Figure 5:
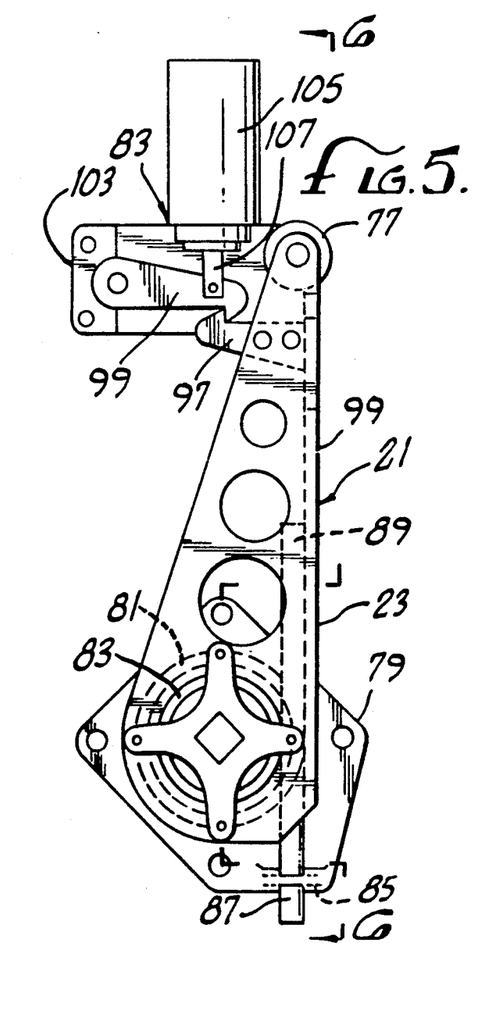
FIG. 5 is a side elevational view of a mechanical door opening system included in the door operating mechanism of FIG. 1.
Figure 6:
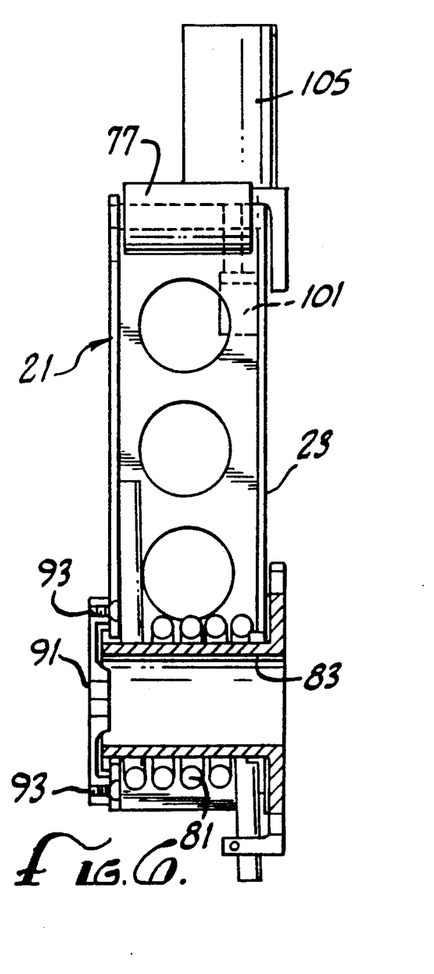
FIG. 6 is a front elevational view of the door opening system, taken in the direction of the arrows 6—6 in FIG. 5.

With specific reference now to FIGS. 5 and 6, the door opening mechanism 21 includes a plate 79 secured to the aircraft frame 13, a spiral torsion spring 81, and a latch assembly 83. The spring is positioned around a shaft 85 integral with the support plate, and the pivot arm 23 is positioned to pivot about the same shaft. A spring-restraining arch 85 also is integral with the support plate, to retain a straight segment 87 at one end of the spiral spring 81. A similar straight segment 89 at the spring's opposite end bears against the pivot arm, such that the spring is arranged to apply a torque to the pivot arm relative to the support plate.

The pivot arm 23 is normally restrained from moving relative to the support plate 79 by interlocking first and second hooks 97 and 99. The first hook 97 is secured to the pivot arm 23 at the base of the pivot arm 101, by pulling a plunger 107 which is pivotally attached to the second hook, and the second hook is secured via a second support plate 103 to the aircraft frame 13. When the pivot arm 23 and the door 11 are to be opened, a solenoid 105, actuated by a control signal, withdraws the second hook 99 from the first hook 97, to release the restraint on the pivot arm.

At the side of the pivot arm facing away from the support plate, an input device 91 for pivoting the arm towards a restrained position is mounted by means of screws 93 to the pivot arm. As previously mentioned, a roller 77 is mounted at the pivot arm's free end, for rolling contact with the aircraft door 11 during opening. As shown in FIG. 1, the swinging ends of the pivot arm and the door are substantially aligned with each other when the door is in its closed position and the pivot arm is restrained from moving. When the door is to be moved to its open position, the restraint on the pivot arm is removed and the arm pivots outwardly such that the roller contacts the door and forces it to open. As the arm and door pivot open, the roller will roll along the door's inside surface.

While the above constitutes a detailed description of the preferred embodiment, it does not limit the invention as claimed, and, in fact, there are many permutations of the above elements which will achieve the same effect, namely to replace current pyrotechnic door opening systems with mechanical stored energy devices and function as a less costly, practical and efficient method of opening doors aboard aircraft in case of emergencies.

I claim:

1. For use with a frame defining an opening and a door mounted on said frame, said door having a closed position in which it covers said opening and an open position in which it exposes said opening, a mechanism for controlling the movement of said door comprising:

door latching means for retaining said door in said closed position, said door latching means being movable from a latched position in which said door is held in said closed position to an unlatched position in which said door can be moved toward said open position, said door latching means including force multiplying means for increasing a force applied to said door latching means for immediately moving said door latching means from said latched position to said unlatched position, door opening means for moving said door from said closed position toward said open position, first resident means for storing mechanical energy and being selectively actuatable to cause said door latching means to move to its unlatched position, and second resident means for storing mechanical energy and being actuatable when said door latching means is in the unlatched position to cause said door opening means to move said door from said closed position toward said open position.

2. The mechanism for controlling door movement of claim 1, wherein:

said second resident means for storing mechanical energy includes a spring, and said door opening means comprises an arm pivotally mounted in operative associated with said door for moving said door from said closed position toward said open position, said arm having a pivot axis, a support fixed relative to the frame and pivotally mounting said arm, said spring being operatively connected between said support and said arm so as to urge said arm to move when said spring is actuated, and restraint means for restraining said pivotally-mounted arm against movement under the urging of said spring, said restraint means being movable between a locked position in which said arm is restrained from being moved under the urging of said spring and an unlocked position in which said arm may be moved under the urging of said spring.

3. The mechanism for controlling door movement of claim 2, wherein said spring is a spiral torsion spring and is wound about said pivot axis.

4. The mechanism for controlling door movement of claim 3, wherein said door opening means further comprises:

rotatable input means connected between said spiral torsion spring and said support, said input means being rotatable about an axis for torsionally winding said spring and thereby storing mechanical energy, and one-way locking means, coupled between said input means and said support, for restraining the release of the spring's stored mechanical energy through the reverse rotation of said input means.

5. The mechanism for controlling door movement of claim 1, wherein said door latching means includes:

a door latch positioned to selectively retain said door in said closed position, said door latch operatively coupled to said first resident means of storing mechanical energy and adapted to be urged out of engagement with said door, a housing fixed relative to one of the frame and the door said housing mounting said first resident means of storing mechanical energy, and restraint means for restraining movement of said door latch under the urging of said first resident means of storing mechanical energy, said restraint means being selectively movable between a locked position in which said door latch may not be moved under the urging of said first resident means of storing mechanical energy and an unlocked position in which said door latch may be moved under the urging of said first resident means of storing mechanical energy.

6. The mechanism for controlling door movement of claim 5, wherein:

said first resident means of storing mechanical energy includes a spring, said door latching means further comprises a shaft connected between said spring and said housing, said shaft being rotatable so as to wind said spring and thereby store mechanical energy, and one-way releasable locking means, coupled between said shaft and said housing, for restraining the release of the spring's stored mechanical energy through the reverse rotation of said shaft, and said force multiplying means includes a gear reduction assembly which is coupled between said shaft and said door latch, said gear reduction assembly increasing a torque associated with the rotation of said shaft for moving said door latch out of engagement with said door.

7. The mechanism for controlling door movement of claim 6, wherein said door latching means further includes:

a rod, a first link pivotally connected at one end to said latch and pivotally connected at the other end to said rod, and a second link pivotally connected at one end to said rod, and pivotally connected at the other end to said spring by said gear reduction assembly.

8. For used with a frame defining an opening and a door mounted on said frame, wherein said door has a closed position in which it covers said opening and an open position in which it exposes said opening, and wherein a selectively-releasable latch retains said door in said closed position, a door latch actuating mechanism comprising:

a housing fixed relative to one of the frame and the door, a spring operatively connected between said housing and said latch and adapted to urge said latch out of restraint of said door, and means for restraining movement of said door latch under the urging of said spring, said means being selectively movable between a locked position in which said door latch may not be moved under the urging of said spring and an unlocked position in which said door latch may be moved under the urging of said spring.

9. The door latch actuating mechanism of claim 8, wherein said door latch actuating mechanism further comprises:
- a shaft connected between said spring and said housing, said shaft being rotatable so as to wind said spring and thereby store mechanical energy, and
- one-way releasable locking means, coupled between said shaft and said housing, for restraining the release of the spring's stored mechanical energy through the reverse rotation of said shaft.

10. The door latch actuating mechanism of claim 8 wherein said spring is a clock spring.

11. The door latch actuating mechanism of claim 8 further comprising force multiplying means coupled between said spring and said latch, for increasing the force applied to said latch means.

12. The door latch actuating mechanism of claim 11, wherein said force multiplying means comprises a gear reduction assembly.

13. For use with a frame defining an opening and a door mounted on said frame, said door having a closed position in which it covers said opening and an open position in which it covers said opening and an open position in which it exposes said opening, a stored energy door opening mechanism comprising:
- an arm pivotally mounted in operative association with said door for moving said door from said closed position toward said open position, said arm having a pivot axis, and said arm having a torque associated with the moving of said door from said closed position toward said open position,
- a housing fixed relative to the frame and pivotally mounting said arm,
- resident means for storing mechanical energy for actuating said pivotally-mounted arm to urge said door from said closed position toward said open position, and
- wherein the pivotally mounted arm is parallel to the door in the door's closed position, said arm mounted so as to transfer said torque to the door when said door is to be opened.

14. The door opening mechanism of claim 13, wherein:
- said resident means for storing mechanical energy comprises a spiral torsion spring coupled between said housing and said arm and adapted to urge said rm to move, said spring being windable about the pivot axis of said arm, and
- said mechanism further comprises restraint means for restraining said pivotally-mounted arm against movement under the urging of said spring, said restraint means being movable between a locked position in which said arm is restrained from being moved under the urging of said spring and an unlocked position in which said arm may be moved under the urging of said spring.

15. The door opening mechanism of claim 14, wherein the restraint means includes an arm latch and a solenoid which is coupled to the arm latch so as to move the arm latch from a locked position in which said arm is restrained from being moved under the urging of said spring to an unlocked position in which said arm may be moved under the urging of said spring.

16. The door opening mechanism of claim 13 wherein the pivotally mounted arm is of a shorter radius than a radius of the door and wherein the pivotally mounted arm's swinging end and the swinging end of the door are substantially aligned when in the door's closed position.

17. The door opening mechanism of claim 16 wherein a rolling contact is mounted at the pivotally mounted arm's swinging end for engaging the door.

18. The door opening mechanism of claim 13 further comprising rotatable input means connected between the spiral torsion spring and the support, the input means being rotatable about an axis for torsionally winding the spring and thereby storing mechanical energy.

19. For use with a frame defining an opening and a door mounted on said frame, said door having a closed position in which it covers said opening and an open position in which it exposes said opening, a mechanism for controlling the movement of said door comprising:
- a door latch positioned to selectively retain said door in said closed position, said door latch adapted to be urged out of engagement with said door;
- a door latch actuator which includes
  - a door latch actuator spring,
  - a housing fixed relative to one of the frame and the door, said housing mounting said door latch actuator spring and coupled thereto at one end,
  - latch restraint means for restraining movement of said door latch under the urging of said door latch actuator spring, said latch restraint means being selectively movable between a locked position in which said door latch may not be moved under the urging of said door latch actuator spring and an unlocked position in which said door latch may be moved under the urging of said door latch actuator spring, and
  - wherein the door latch is operatively coupled to the other end of the door latch spring;
- a door opening mechanism which includes
  - a door opener spring,
  - an arm pivotally mounted in operative association with said door for moving said door from said closed position toward said open position, said arm having a pivot axis,
  - a support fixed relative to the frame and pivotally mounting said arm, said door opener spring being operatively connected between said support and said arm so as to urge said arm to move said door toward said open position, and
  - arm restraint means for restraining said pivotally-mounted arm against movement under the urging of said door opener spring, said arm restraint means being movable between a locked position in which said arm is restrained from being moved under the urging of said door opener spring and an unlocked position in which said arm may be moved under the urging of said door opener spring.

20. The mechanism for controlling door movement of claim 19 wherein:
- said door latch spring is a clock spring,
- said latch restraint means includes a releasable locking device, coupled between said shaft and said housing, for restraining the release of the spring's stored mechanical energy through the reverse rotation of said shaft, and
- said door latch actuator further comprises a shaft coupled to said clock spring, said shaft being rotatable so as to wind said clock spring and thereby store mechanical energy, and force multiplying means for increasing a torque associated with release of the spring's stored mechanical energy through reverse rotation of said shaft to urge said door latch out of engagement with said door, said force multiplying means coupled between said latch spring and said door latch.

21. The mechanism for controlling door movement of claim 20, wherein said force multiplying means includes a gear reduction assembly.

22. The mechanism for controlling door movement of claim 20, wherein the latch restraint means includes a ratchet coupled to the shaft, a pawl coupled to the housing for engaging the ratchet, and a latch actuator solenoid which is occupied to the pawl so as to remove the pawl from engagement with the ratchet and thereby releasing the ratchet from the locked position and enabling the shaft to rotate under the influence of the clock spring.

23. The mechanism for controlling door movement of claim 19, wherein said door latch includes:

a rod that is positioned substantially parallel a periphery of the door, a latch that is pivotally connected at one end to said rod, said latch having a latched position in which the door is retained in the closed position and an unlatched position in which said door may be moved towards the open position, and an actuator link that is pivotally connected at one end to said rod, and pivotally connected to the door latch actuator at the other end so as to urge said latch to move to an unlatched position in response to release of stored energy of the latch spring.

24. The mechanism for controlling door movement of claim 19 wherein the door opening mechanism further includes rotatable input means connected between said door opener spring and said support, said input means being rotatable about an axis to wind said door opener spring and thereby store mechanical energy.

25. The mechanism for controlling door movement of claim 19 wherein the door opener spring is a spiral torsion spring coupled between said housing and said arm and adapted to urge said arm to move, said spring being wound about the pivot axis of said arm.

26. The mechanism for controlling door movement of claim 25 wherein:

the pivotally mounted arm has a torque upon discharge of the spiral torsion spring, said arm transferring the torque to the door for moving the door toward the open position, the pivotally mounted arm is mounted parallel to the door in the door's closed position and which includes a rolling contact at the arm's swinging end for engaging the door, and the pivotally mounted arm is of a shorter radius than a radius of the door and wherein the pivotally mounted arm's swinging end and the swinging end of the door are substantially aligned when in the door's closed position.

27. For use with a frame defining an opening and a door mounted on said frame, said door having a closed position in which it covers said opening and an open position in which it exposes said opening, a mechanism for controlling the movement of said door comprising:

a door latch position to selectively retain said door in said closed position, said door latch adapted to be urged out of engagement with said door, said door latch including a rod that is positioned substantially parallel to a periphery of the door, a latch that is pivotally connected at one end to said rod, said latch having a latched position in which the door is retained in the closed position and an unlatched position in which said door may be moved towards the open position, and an actuator link that pivotally connected at one end to said rod, and pivotally connected to the door latch actuator at the other end so as to urge said latch to move to an unlatched position in response to release of the stored energy of the latch spring;

a door latch actuator which includes a clock spring, a housing fixed relative to one of the frame and the door, said housing mounting said clock spring, a shaft coupled to said clock spring, said shaft being rotatable so as to wind said spring and thereby store mechanical energy, latch restraint means for restraining movement of said door latch under the urging of said clock spring, said latch restraint means being selectively movable between a locked position in which said door latch may not be moved under the urging of said clock spring and an unlocked position in which said door latch may be moved under the urging of said clock spring, said latch restraint means including a ratchet coupled to the shaft, a pawl coupled to the housing for engaging the ratchet and preventing the release of the clock spring's stored mechanical energy through the reverse rotation of the shaft, and a latch actuator solenoid which is coupled to the pawl so as to selectively remove the pawl from engagement with the ratchet and thereby releasing the ratchet from the locked position and enabling the shaft to rotate under the influence of the clock spring, and a gear reduction assembly which is coupled between the shaft and the actuator link so as to increase the mechanical energy supplied by said clock spring upon release of its mechanical energy so as to supply a one-time immediate high force;

a door opening mechanism which includes a spiral torsion spring, an arm pivotally mounted in operative association with said door for moving said door from said closed position toward said open position, said arm having a pivot axis which is common with an axis about which the spiral torsion spring is wound, a support fixed relative to the frame and pivotally mounting said arm, said spiral torsion spring being operatively connected between said support and said arm so as to urge said arm to move said door toward the open position, and arm restraint means for restraining said pivotally-mounted arm against movement under the urging of said spiral torsion spring, said arm restraint means being movable between a locked position in which said arm is restrained from being moved under the urging of said spiral torsion spring and an unlocked position in which said arm may be moved under the urging of said spiral torsion spring, rotatable input means connected between said spiral torsion spring and said support, said input means being rotatable about an axis to wind said spiral torsion spring and thereby store mechanical energy, wherein the pivotally mounted arm has a torque upon discharge of energy that is stored by the spiral torsion spring, said arm transferring the torque to the door for moving the door toward the open position, wherein the pivotally mounted arm is mounted parallel to a periphery of the door in the door's closed position and which includes a rolling contact at the arm's swinging end for engaging the door, and wherein the pivotally mounted arm is of a shorter radius than a radius of the door and wherein the pivotally mounted arm's swinging end and the swinging end of the door are substantially aligned when in the door's closed position.

* * * * *

UNITED STATES PATENT AND TRADEMARK OFFICE
CERTIFICATE OF CORRECTION

PATENT NO. : 5,090,640
DATED      : February 25, 1992
INVENTOR(S): Donald J. Fessett It is certified that error appears in the above-identified patent and that said Letters Patent is hereby corrected as shown below:

Column 5, line 41, change "associated" to --association--.

Column 6, line 13, after "door" insert --,--.

Column 7, line 52, change "rm" to --arm--.

Column 9, line 19, change "which is occupied" to --which is coupled--.

In the ABSTRACT, line 6, change "door latch mechanism leaving" to --door latch mechanism including--.

Signed and Sealed this

Twenty-fourth Day of August, 1993

Attest:

BRUCE LEHMAN

Attesting Officer

Commissioner of Patents and Trademarks